United States Patent [19]

Coffinberry et al.

[11] Patent Number: 5,275,000
[45] Date of Patent: Jan. 4, 1994

[54] REDUCING THERMAL DEPOSITS IN ENDOTHERMIC FUEL REACTORS OF PROPULSION SYSTEMS

[75] Inventors: George A. Coffinberry; Michael J. Epstein, both of West Chester, Ohio

[73] Assignee: General Electric Company, Cincinnati, Ohio

[21] Appl. No.: 931,232

[22] Filed: Aug. 17, 1992

[51] Int. Cl.[5] .............................................. F02K 9/44
[52] U.S. Cl. .................................... 60/734; 60/39.12
[58] Field of Search ....................... 60/734, 736, 39.12

[56] References Cited

U.S. PATENT DOCUMENTS

| | | | |
|---|---|---|---|
| 2,917,903 | 12/1959 | Stineman et al. | 60/736 |
| 2,956,402 | 10/1960 | Rae | 60/736 |
| 3,739,581 | 6/1973 | Talmor | 60/206 |
| 3,740,949 | 6/1973 | Wolf et al. | 60/267 |
| 3,846,979 | 11/1974 | Pfefferle | 60/39.04 |
| 4,712,610 | 12/1987 | Kesten et al. | 165/104.12 |
| 4,841,723 | 6/1989 | Lau et al. | 60/204 |
| 5,161,365 | 11/1992 | Wright | 60/736 |

OTHER PUBLICATIONS

"Reaction Kinetics of Methylcyclohexane Dehydrogenation over a Sulifided Pt+Re/Al$_2$O$_3$ Reforming Catalyst" by Michael A. Pacheco and Eugene E. Petersen, in Journal Of Catalysis, 507–516, 1985.

"Coke Tolerance of Catalytic Reforming Catalysts" by In-Slk Nam, John Eldridge and J. R. Kittrell, in Ind. Eng. Chem. Dev., 544–549, 1985.

"Catalytic Reforming of Naphtha in Petroleum Refineries", by M. Dean Edgar, in Applied Industrial Catalysis, vol. 1, 123–148, 1983.

Roth et al., Fuel as a Heat Sink, Space/Aeronautics, Mar. 1960, pp. 56–60.

Primary Examiner—Stephen M. Johnson
Attorney, Agent, or Firm—Jerome C. Squillaro

[57] ABSTRACT

An endothermic hydrocarbon fuel system to avoid thermally induced coking on the catalytic surfaces of an heat exchanger used as a reactor to dehydrogenate the fuel so that it provides a heat sink for the heat exchanger for cooling parts of high speed aircraft. The invention provides a means to feed an acceptable concentration of hydrogen to the reactor feed stock, wherein the feed stock is a portion of the endothermic hydrocarbon fuel that is catalytically dehydrogenated to provide a heat sink. The preferred embodiment uses Methylcyclohexane as a fuel and provides a return loop to recycle a fraction of the reaction products to provide the hydrogen to the reactor feedstock.

10 Claims, 1 Drawing Sheet

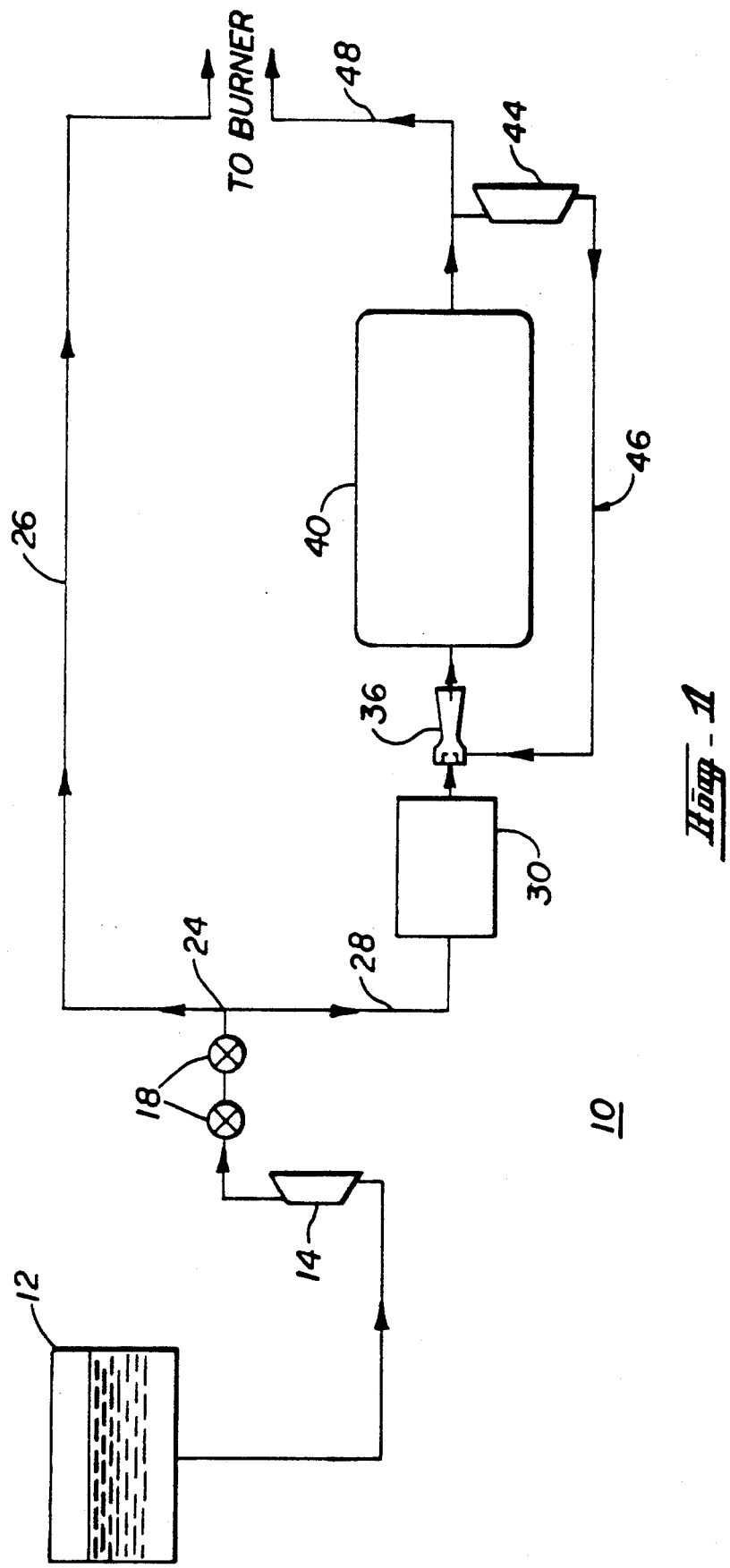

REDUCING THERMAL DEPOSITS IN ENDOTHERMIC FUEL REACTORS OF PROPULSION SYSTEMS

BACKGROUND OF THE INVENTION

1. Field of the Invention

This invention relates to heat exchangers that are used as reactors to catalytically dehydrogenate endothermic hydrocarbon fuels in propulsion systems with particular application to gas turbine engine combustors. The present invention provides apparatus and methods for avoiding thermally induced fuel deposits on the catalytic surfaces of these reactor heat exchangers.

2. Description of Related Art

It is well known to design aircraft propulsion systems to use endothermic hydrocarbon fuels. Endothermic fuels hold the potential for significantly increasing the performance of gas turbine and other engines as a result of their heat sink potential. One particularly important endothermic hydrocarbon fuel is Methylcyclohexane (MCH) which can be catalytically converted to toluene and hydrogen with a theoretical absorption of 1959 Btu/lbm. This example includes both the sensible and chemical absorption of heat and assumes a 99% conversion and that the fuel was heated from 70° F. to 1340° F.

The practical implementation of converting MCH to toluene and hydrogen requires the use of a heterogeneous catalyst. Reforming catalysts conventionally used in the conversion of petroleum naphtha feedstocks to high octane gasoline are also used in the present invention. These catalysts essentially dehydrogenate cyclo paraffinic reactants to produce the desired result. Such catalysts include, but are not limited to Pt-Al2O3, Pt-Re-Al2O3, and Pt-Ir-Al2O3. Over the range of temperatures and pressures in which these reactions typically occur (400°-900° K. and 1 to 150 atmospheres) competing reactions take place which include cracking, rehydrogenation, and coke formation. The formation of coke in particular, is a problem as it tends to strongly adsorb on the surface of the catalyst, fouling active sites and reducing catalyst surface area and pore passages, thereby reducing overall catalytic activity.

It has been reported in the petroleum industry that the inclusion of hydrogen (H2) in the reactant feed suppresses the formation of coke, see "Catalytic Reforming of Naphtha in Petroleum Refineries" by M. Dean Edgar, published in Applied Industrial Catalysis, Volume 1, 1983; "Coke Tolerance of Catalytic Reforming Catalysts" by In-Sik Nam, John W. Eldridge, and J. R. Kittrell, published in Ind. Eng. Prod. Res. Dev., 1985; and "Reaction Kinetics of Methylcyclohexane Dehydrogenation over a Sulfided Pt+Re/Al2O3 Reforming Catalyst" by Michael A. Pacheco and Eugene E. Petersen, published in Journal Of Catalysis, 1985.

SUMMARY OF THE INVENTION

The present invention provides apparatuses and methods to use a heat exchanger as a reactor to catalytically dehydrogenate a suitable endothermic hydrocarbon fuel. The invention provide a heat sink for the heat exchanger and avoids thermally induced coking on the catalytic surfaces of a combination heat exchanger and reactor which is used in propulsion engine combustion systems for cooling parts of high speed aircraft. The invention provides a means to feed an acceptable concentration of hydrogen to the reactor feed stock, wherein the feed stock is a portion of the endothermic hydrocarbon fuel that can be catalytically dehydrogenated to provide a heat sink for the heat exchanger. The preferred embodiment uses Methylcyclohexane as a fuel and provides a return loop to recycle a fraction of the reaction products (toluene + hydrogen) from the reactor to provide an acceptable concentration of hydrogen to the reactor feed. A means is provided to split the product flow and return the desired fraction of product to the inlet of the reactor.

ADVANTAGES

Among the advantages provided by the present invention is that the reactor recycle loop increases the hydrogen inlet concentration and reduces the amount of coke formation on the surface of the catalyst within the reactor. As a result, catalytic activity does not degrade as quickly and the propulsion system is more economical to maintain and operate.

The present invention allows construction of smaller and lighter weight reactors because it reduces coke formation on the reactor catalytic surfaces that would otherwise decrease its effectiveness more quickly.

The present invention provides a more durable longer lasting endothermic fuel reactor and combustion system which is ultimately less expensive to operate and more commercially feasible than similar combustor systems presently contemplated.

BRIEF DESCRIPTION OF THE DRAWINGS

The foregoing aspects and other features of the invention are explained in the following description, taken in connection with the accompanying drawings where:

FIG. 1 is a schematic view of a combustor system in accordance with one embodiment of the present invention.

DETAILED DESCRIPTION OF THE INVENTION

Schematically illustrated in FIG. 1 is an aircraft gas turbine engine combustion system, generally shown at 10, for use with endothermic fuels such as MCH and which may be used other types of propulsion engines such as a rocket engine. The combustion system 10 has an endothermic fuel supply 12, preferably Methylcyclohexane (MCH) in the preferred endothermic fuel in the exemplary illustration of FIG. 1, and a pump 14 which pumps the MCH through metering and throttle valves 18. The fuel flow is split at 24 and a first portion of the fuel flow is bypassed around a catalytic reactor 40 and sent through a bypass line 26 directly to the engine's burner or combustor.

The remaining fuel is directed through the reactor fuel line branch 28. This remaining fuel will serves as catalytic reactor feed in order to make use of its cooling sink capability. The remaining fuel is passed through a preheater 30 then to a mixer 36 where it is mixed with a fraction of the reaction products (toluene + hydrogen) from a catalytic reactor 40 for the purpose of providing an acceptable concentration of hydrogen to the reactor feed. Mixer 36 may be in the form an ejector or jet pump. A flow splitting means 44 splits the product flow from the catalytic reactor 40 and returns the desired fraction of product to the mixer 36 which passes it to the inlet of the reactor by way of recycle loop 46. The flow splitting means 44 may be in the form of a compressor which pressurizes and returns flow by way of the recycle loop 46. The recycle loop 46 increases the hydrogen inlet concentration and reduces the amount of coke formation on the surface of the catalyst.

The remainder of the product flow from the catalytic reactor 40 is sent to the burner through a second fuel line 48 to be combusted with the first portion of fuel from the bypass line 26. Methylcyclohexane is catalytically converted to toluene and hydrogen with a theoretical absorption of 1959 Btu/lbm which includes both the sensible and chemical absorption of heat and assumes a 99% conversion and that the fuel was heated from 70° F. to 1340° F. This reaction in reactor 40 allows the reactor to be used as a heat exchanger to cool parts of an aircraft (not shown).

While the preferred embodiment of the present invention has been described fully in order to explain its principles, it is understood that various modifications or alterations may be made to the preferred embodiment without departing from the scope of the invention as set forth in the appended claims.

We claim:

1. An endothermic fuel system for a propulsion engine, said endothermic fuel system comprising:
   a fuel supply means for supplying a fuel that is an endothermic hydrocarbon fuel which can be catalytically dehydrogenated to provide a heat sink,
   a catalytic reactor that is used as a heat exchanger, said reactor having an inlet and outlet and a catalytic material operably disposed within said reactor to provide surface contact with and to catalytically dehydrogenate said fuel, said inlet operably connected to said fuel supply so as to be able to receive at least a portion of said fuel from said endothermic fuel supply during engine operation of the propulsion engine to be used as feedstock for said reactor,
   a hydrogen feed means for adding a sufficient amount of hydrogen to said feedback to inhibit coke formation in said reactor,
   said hydrogen feed means comprising a recycle loop from said reactor's outlet to said reactor's inlet, said recycle loop operable to return a fraction of a product from said reactor outlet to said reactor inlet, and
   a means to convey a remaining portion of said product to a burner of the propulsion engine.

2. An endothermic fuel system as claimed in claim 1 wherein said fuel is Methylcyclohexane.

3. An endothermic fuel system as claimed in claim 2 further comprising a fuel splitting means connected to said reactor outlet said fuel splitting means operable to split fuel received from said reactor and direct a first portion of fuel flow into said recycle loop and direct a second portion of fuel flow to said burner.

4. An endothermic fuel system as claimed in claim 3 wherein said fuel splitting means further comprises a compressor means for compressing said first portion of fuel flow in said recycle loop.

5. An endothermic fuel system as claimed in claim 4 further comprising a mixing means to mix the endothermic hydrocarbon fuel together with said first portion of fuel flow in said recycle loop wherein said mixing means comprising a mixing device from a group of mixing devices, said group consisting of an ejector type mixer and a jet pump.

6. An endothermic fuel system as claimed in claim 3 further comprising a mixing means to mix the endothermic hydrocarbon fuel together with said first portion of fuel flow in said recycle loop wherein said mixing means comprises a mixing device from a group of mixing devices, said group consisting of an ejector type mixer and a jet pump.

7. A cooling method for catalytically dehydrogenating an endothermic hydrocarbon fuel to provide a heat sink in a heat exchanger for cooling a high speed aircraft, said method comprising the following steps:
   a) supplying at least a portion of the endothermic hydrocarbon fuel to the heat exchanger that is operated as a catalytic reactor and the portion of endothermic hydrocarbon fuel is used as a feedstock in the reactor which has a catalytic material operably disposed within the reactor to provide surface contact with and to catalytically dehydrogenate the portion of fuel,
   b) supplying a sufficient amount of hydrogen to and mixing it with the feedstock to inhibit coke formation in said reactor,
   c) catalytically dehydrogenating the feedstock mixture in said reactor when said feedstock mixture comprises the endothermic fuel and hydrogen, and
   d) combusting a product flow from said reactor in an aircraft gas turbine engine burner of the high speed aircraft.

8. A cooling method as claimed in claim 7 wherein the hydrogen is supplied to the feedstock in step b by recycling a portion of said product flow from an outlet of the catalytic reactor to an inlet of the reactor by way of recycle loop.

9. A cooling method as claimed in claim 8 wherein the endothermic fuel is Methylcyclohexane.

10. A cooling method as claimed in claim 9 wherein a remaining portion of the endothermic hydrocarbon fuel not supplied to the heat exchanger and a remaining portion of the feedstock mixture not recycled to the reactor is combusted in the aircraft gas turbine engine burner.

* * * * *